May 28, 1968   D. E. CHRISTIE, ET AL   3,385,042
BERRY HARVESTER

Original Filed Oct. 28, 1963   9 Sheets-Sheet 2

INVENTOR.
DAVID E. CHRISTIE
KARL E. WINQUIST

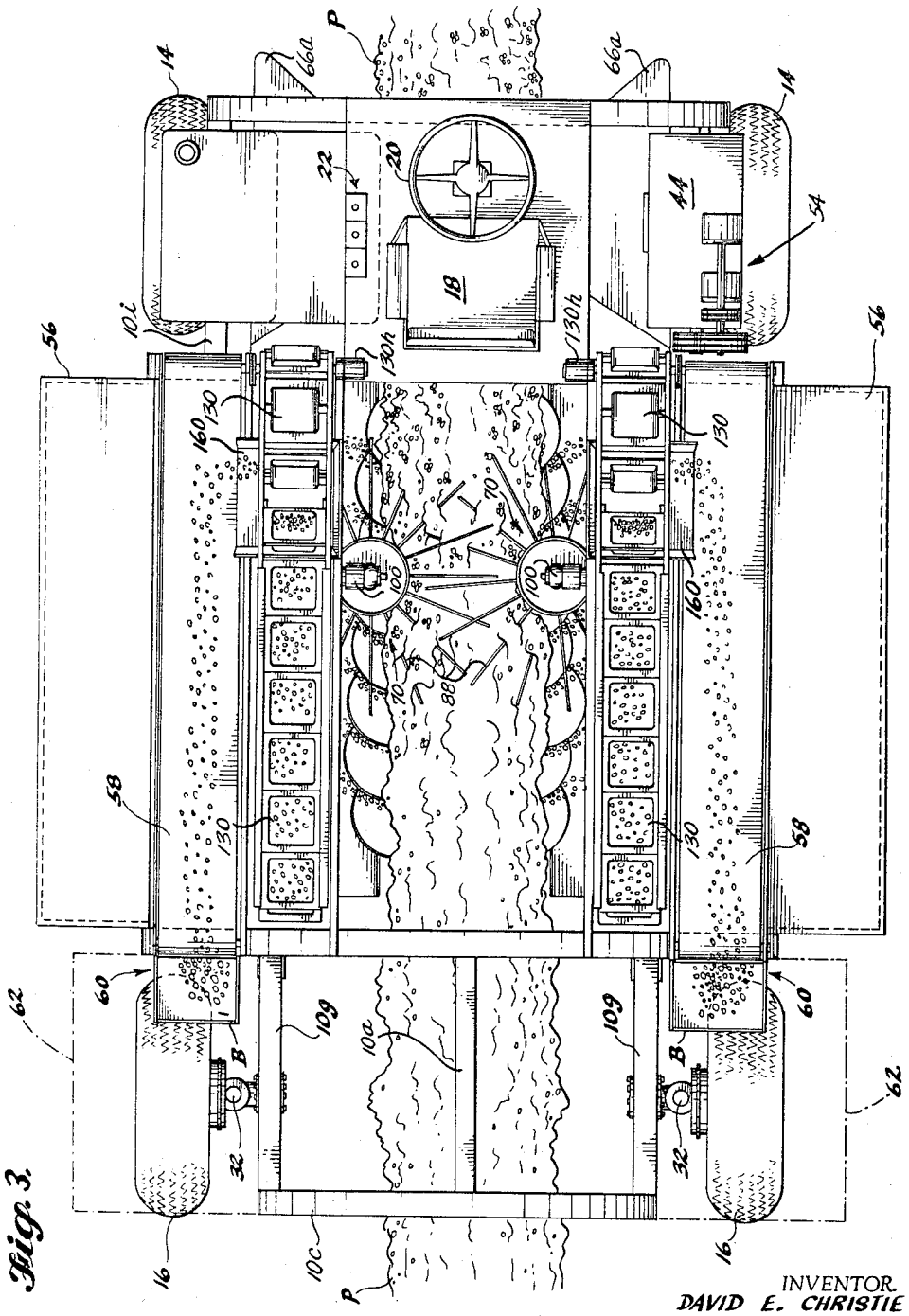

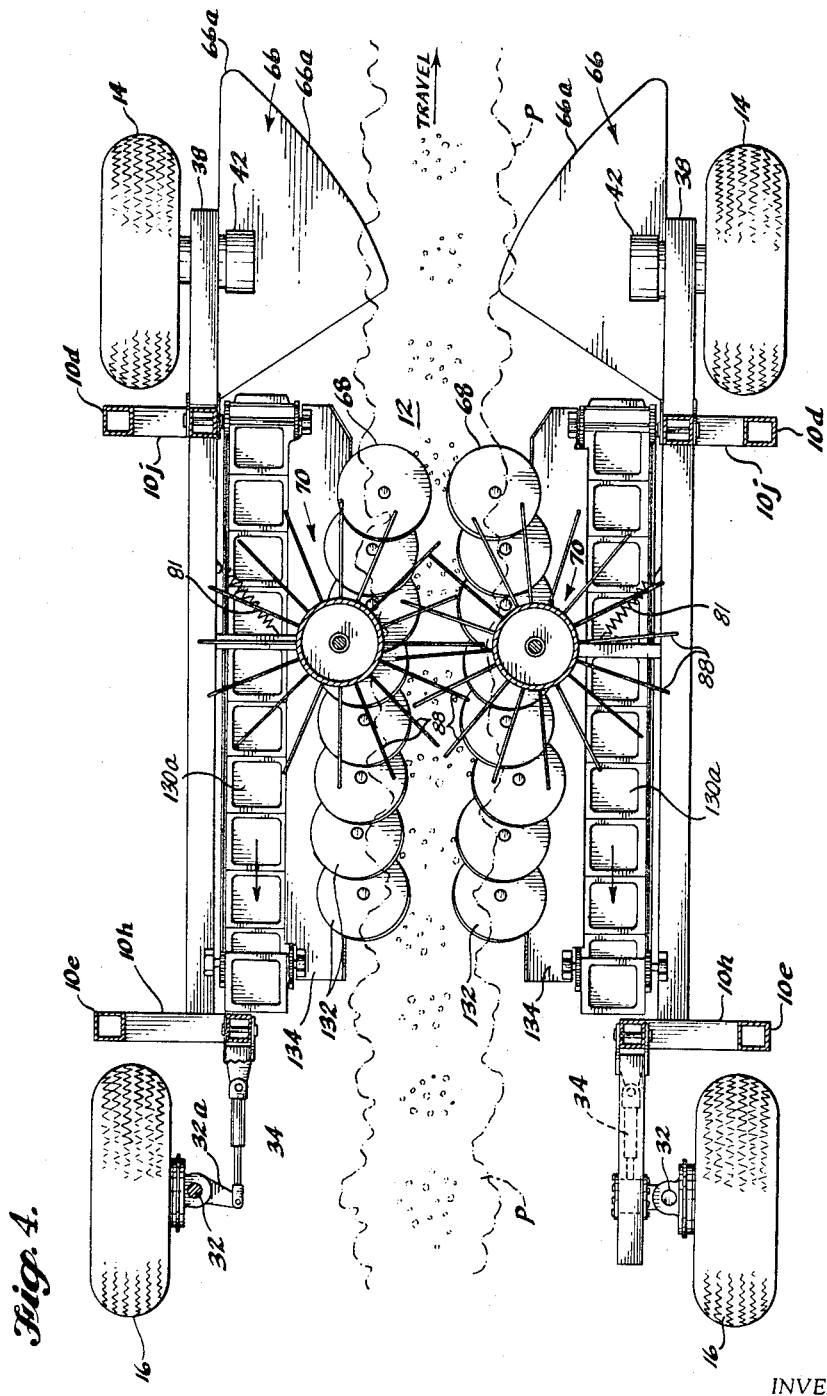

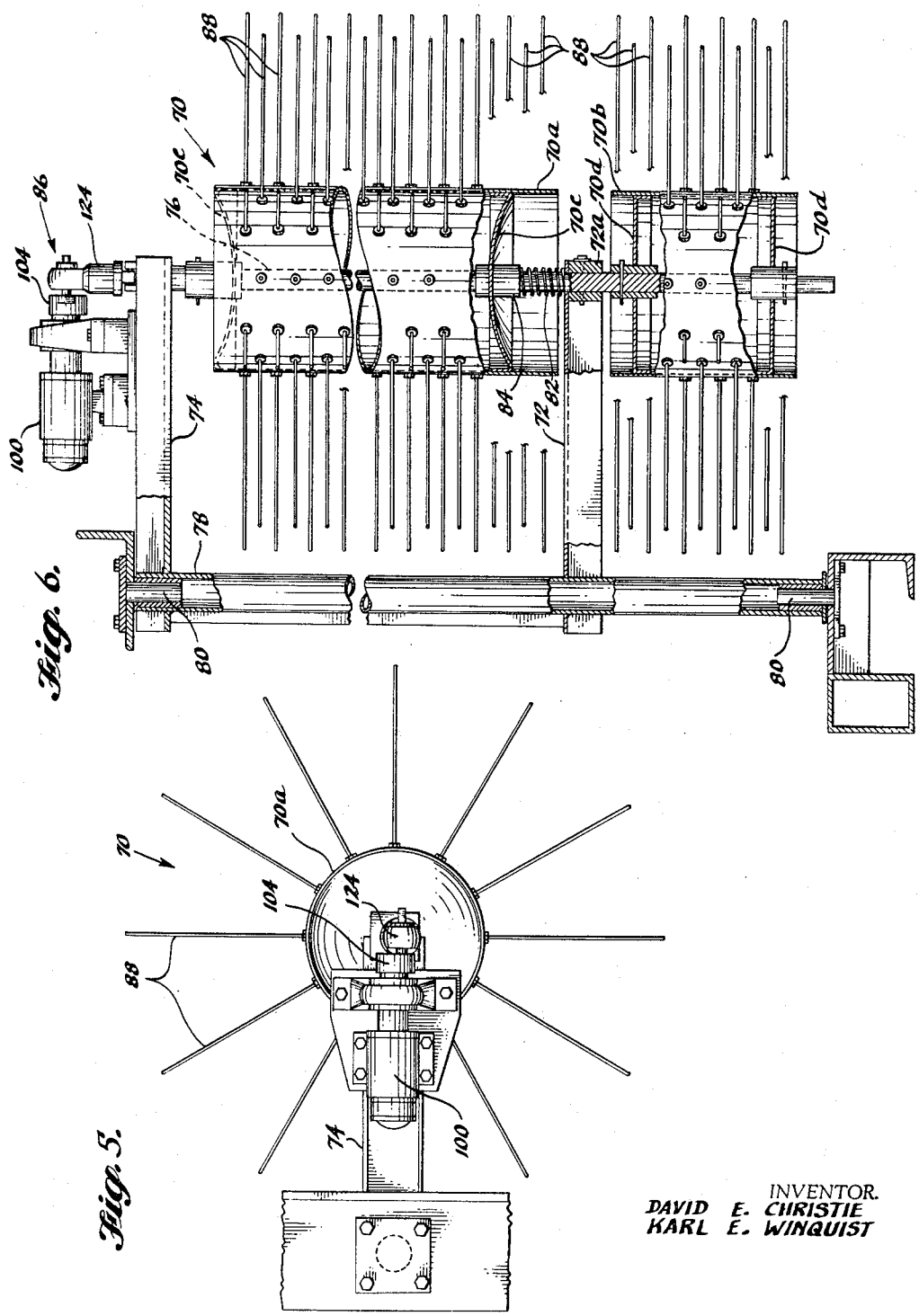

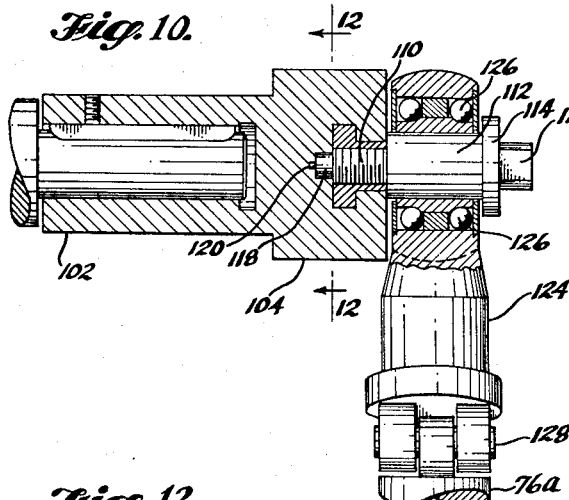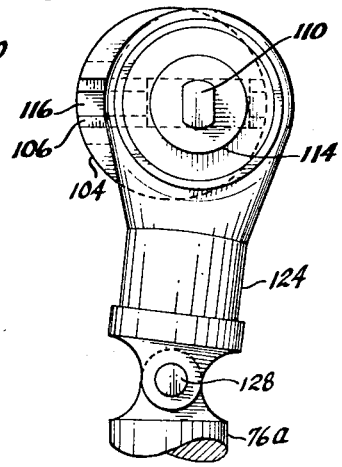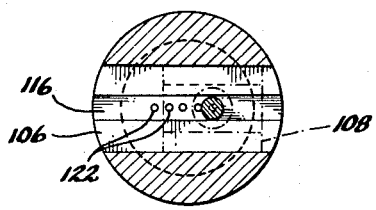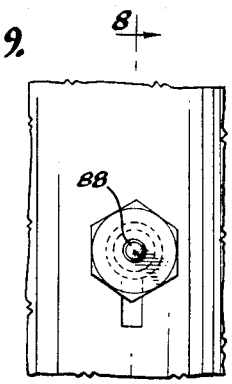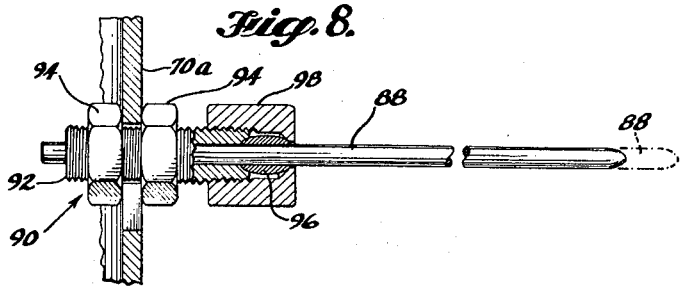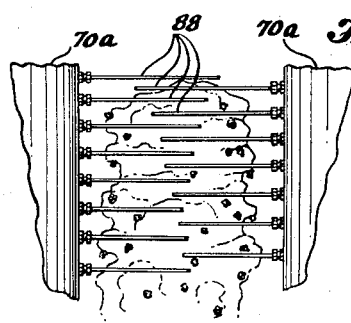

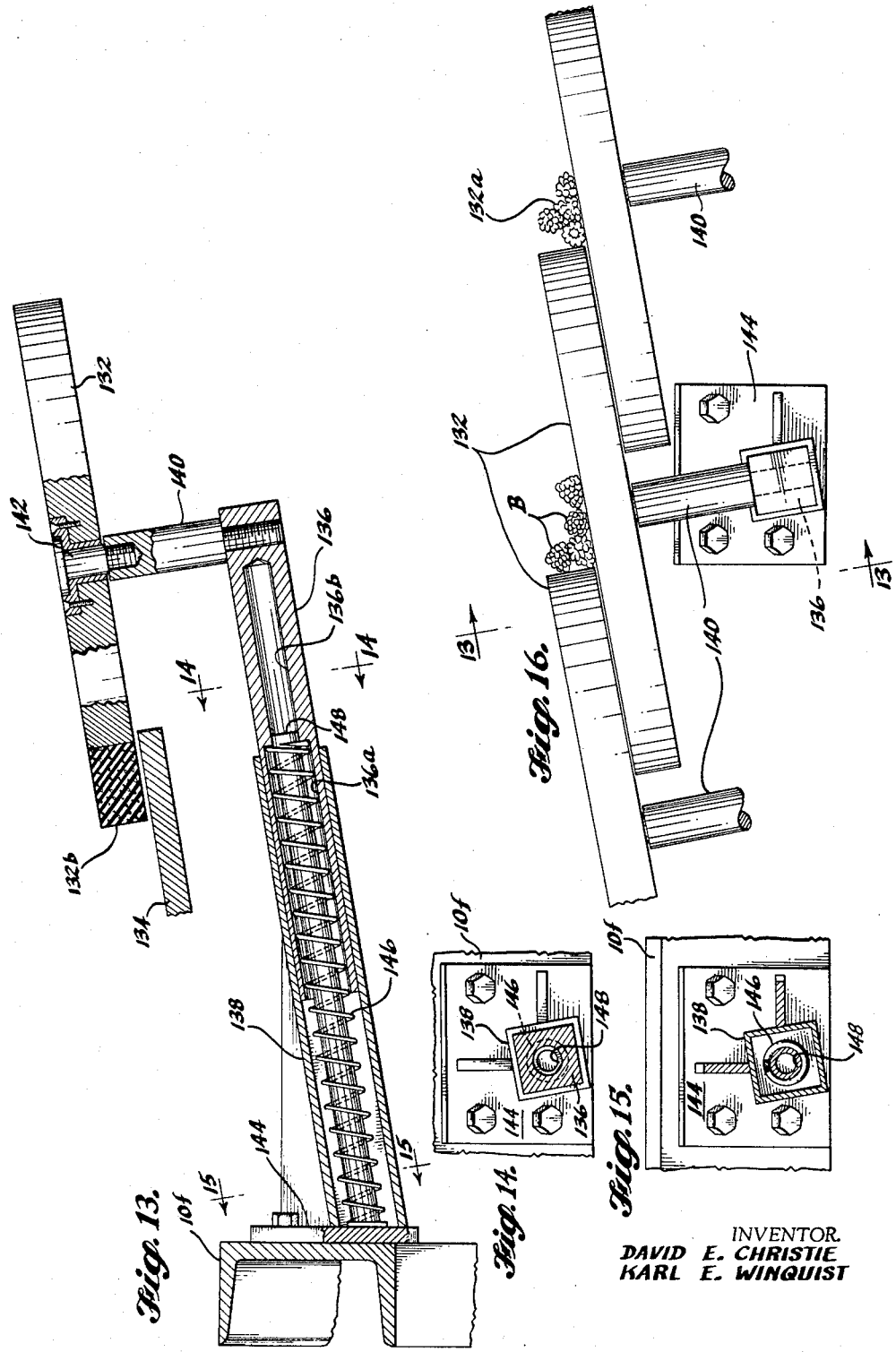

May 28, 1968 D. E. CHRISTIE ET AL 3,385,042
BERRY HARVESTER
Original Filed Oct. 28, 1963 9 Sheets-Sheet 8
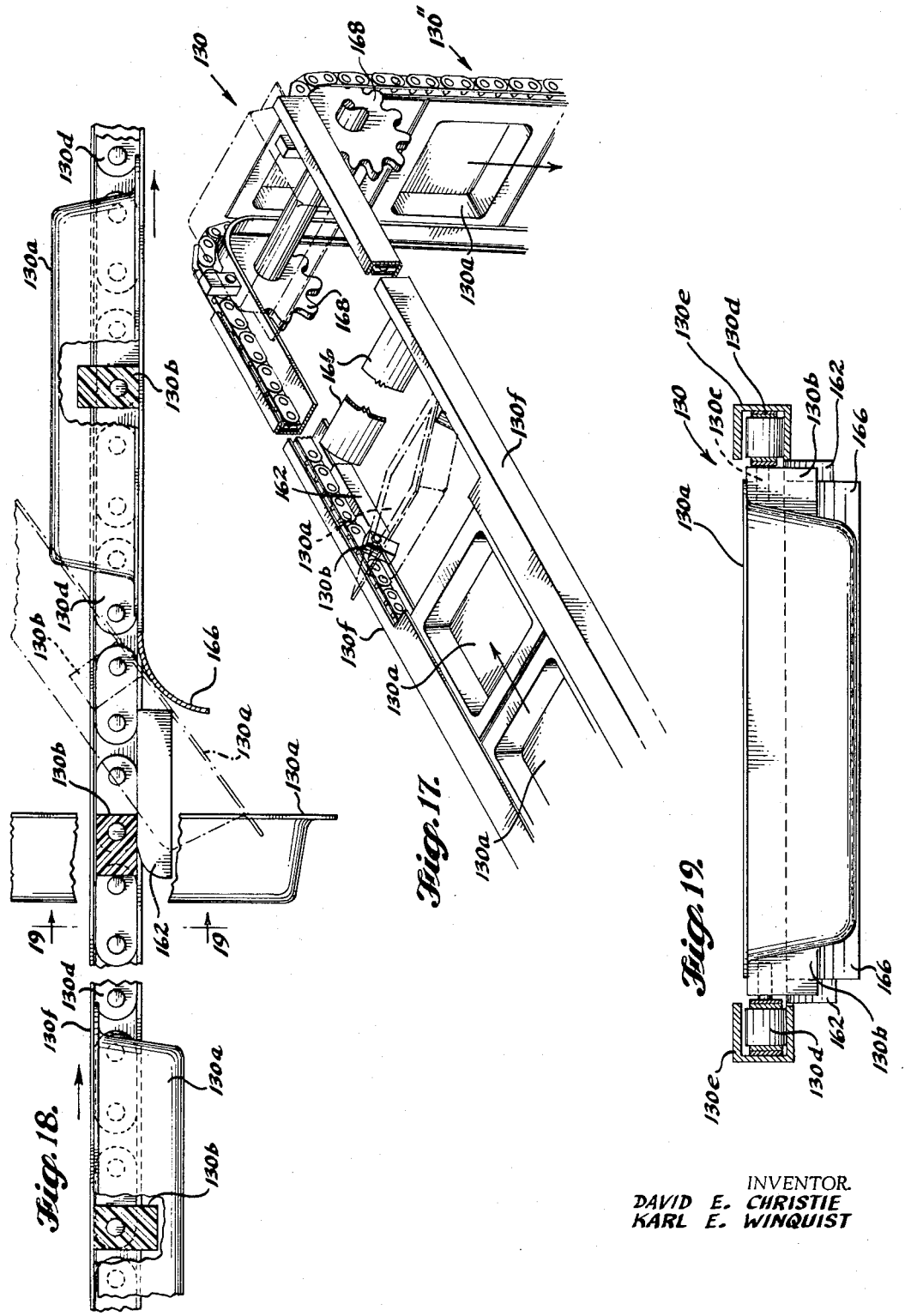
INVENTOR.
DAVID E. CHRISTIE
KARL E. WINQUIST

INVENTOR
DAVID E. CHRISTIE
KARL E. WINQUIST

United States Patent Office 3,385,042
Patented May 28, 1968

3,385,042
BERRY HARVESTER
David E. Christie and Karl E. Winquist, Portland, Oreg., assignors to Oeco Corporation, Portland, Oreg., a corporation of Oregon
Original application Oct. 28, 1963, Ser. No. 319,249, now Patent No. 3,325,984, dated June 20, 1967. Divided and this application Mar. 20, 1967, Ser. No. 654,667
10 Claims. (Cl. 56—330)

ABSTRACT OF THE DISCLOSURE

In a berry harvesting machine comprising a ground-traversing carriage and means mounted upon the carriage to dislodge the berries from the plants as the carriage moves along the length of a row of plants, the invention comprises a novel means to catch the falling berries and direct them to one or more points of disposal. Such means comprises opposing series of generally flat successively overlapping discs individually mounted on reciprocative supports and urged by force-applying means into contact with the sides of the row of plants so as to form aprons conforming to contour of the berry plants and any posts being traversed by the harvester. The discs are in rolling contact with the plants so as to avoid any abrasive damage to the stalks.

---

This application is a division of Serial No. 319,249 filed October 28, 1963 and now Patent 3,325,984.

This invention relates to improvements in machines for harvesting berries from plants generally of the type which grow upright or are trained to present their fruit at an elevation above ground level, examples being raspberries, loganberries, blackberries, etc. The invention is best suited for harvesting from plants grown in uniform rows so as to achieve maximum efficiency in the harvesting operation and the machine is herein illustratively described by reference to the presently preferred embodiment thereof; however it will be recognized that certain modifications and changes therein with respect to details may be made without departing from the underlying essentials thereof.

The high cost and drudgery of labor, and the difficulty of finding suitable labor at the critical times when harvesting is imperative and urgent, is now and has been one of the most difficult burdens for the grower. In fact, it is often impossible to marshal a sufficiently large crew to keep the ripening berries picked on a continuing basis during the season, and there is much loss and crop depreciation as a result thereof. The general purpose of this invention is to provide a practicable and efficient machine which will overcome these problems and while not altogether eliminating the need for labor, greatly reduces the total man hours required to harvest a crop and makes the harvesting work relatively pleasant and sufficiently productive economically as to permit a wage which will attract the most desirable workers. At the same time the invention aims to improve the quality of the harvest by enabling gathering of the ripening berries selectively in such controlled manner and at such frequent intervals as to assure a substantially optimum degree of ripeness and sugar content therein at the sime of the harvest.

A further object is to devise a machine which will harvest berries without damaging the plants or berries and without appreciable loss of berries.

Still another object is to devise a versatile harvesting machine capable of adjustment in its operating or functional characteristics so as to suit the requirements of selective removal of all berries of certain ripeness. It is found that the operating characteristics necessary for optimum results with one type of berry will differ from those best suited for another type. Moreover, the operating mode best suited to harvest from plants of the same type, even in the same field, may vary during different parts of the day or under different weather conditions. Different characteristics of the plant growth also can have a marked effect such as bushiness, stiffness of the vines or branches, their growth patterns, the density and distribution of foliation, height above ground, etc. Accordingly, it is an object hereof to provide a versatile harvesting machine having berry-dislodging means which are adjustable and the operating motion factors of which are adjustable so as to suit the variable conditions encountered in harvesting. A specific object is to device a machine in which such adjustments may be made relatively quickly and easily in the field.

An important object is to provide a mechanical harvester which operates rapidly and economically and which may be produced at a cost readily justified by the economic benefits flowing from its used.

Still another object is to devise a readily maintainable, wear resistant mechanism for harvesting berries as described.

In accordance with the invention as herein disclosed, a pair of elongated multi-fingered shakers of generally cylindrical form are mounted rotationally on transversely spaced upright axes in the carriage of the harvester and engage the plants passing between them more or less uniformly as the machine progresses along the field. Preferably, these shakers rotate freely, that is in response to reaction of the plant growth against the radially projecting fingers, and while so rotating, the shakers are vibrated axially in order to impart vibration to the berry laden stems of such stroke and frequency that only the desired, ripe berries are selectively dislodged. The stroke is made adjustable in length in accordance with the requirements of the particular crop. Preferably the shaker drive mechanism achieving this result comprises a power-driven crank shaft mounted transversely to and substantially intersecting relationship with the shaker axis and carrying a crank member having a series of locating elements at respectively different radii from the cranks shaft's axis. Disengageable coupling means interconnects the shaker with a selected one of these locating elements in order thereby to vary the stroke of reciprocation.

A further important feature of adjustability resides in the provision of means to vary the reciprocation frequency of the shakers independently of the stroke. While other devices are available to drive the shaker at variable frequency, the preferred mechanism comprises a hydraulic motor drivingly connected to the crank shaft and controlled as to speed by simple valving arrangements permitting varying at will the rate of flow of hydraulic fluid through the motor passages.

Still another feature of the invention resides in providing shaker fingers the projection of which differs along the length of the shaker, so as to accommodate variations in growth of the plants as a function of height above ground level and generally in order to achieve optimum effectiveness at dislodging berries at the desired degree of ripeness from all parts of the plants. As a related feature, the shakers comprise hollow tubes having a plurality of apertures therein each with a clamp retentively holding a shaker finger. Such fingers extending through the aperture. These clamps are individually operable to release and re-engage the fingers, thereby to permit adjustment of the radial projection of the fingers in any desired manner.

Other features and objects relate to the overlapping rotative disk collector aprons and details thereof by which berries shaken from the vines are interrupted and directed to conveyor apparatus.

These and other features, objects and advantages of the invention will become more fully evident from the following description thereof by reference to the accompanying drawings.

FIGURE 3 is a top view thereof, while FIGURE 4 is a sectional view taken on line 4—4 of FIGURE 1.

FIGURE 5 is a top view of a shaker rotor and the principal elements by which it is supported and driven.

FIGURE 6 is a side view of the shaker rotor shown in FIGURE 5.

FIGURE 7 is a fragmentary view of a pair of shakers each having fingers which are of a different length as a function of position along the length of the shaker.

FIGURE 8 is a fragmentary sectional detail of a shaker showing a means to mount a shaker finger thereon so as to permit adjustment of its projecting length.

FIGURE 9 is a face view of the fragmentary portion of shaker shown in FIGURE 8.

FIGURE 10 is an enlarged detail side view partially in section showing a shaker drive mechanism as seen transversely to the power shaft thereof.

FIGURE 11 is an enlarged detail side view taken at right angles to the view in FIGURE 10.

FIGURE 12 is a sectional view taken on line 12—12 in FIGURE 10.

FIGURE 13 is an enlarged detail view taken on a transverse plane slightly tilted from the vertical (so as to see the disk edgewise) which plane passes through a portion of one side of the machine in order to illustrate one of the rotary disks and its supporting means, comprising components of the catch apron mechanisms along each side of the machine.

FIGURE 14 is a sectional view taken on line 14—14 in FIGURE 13.

FIGURE 15 is a sectional view taken on line 15—15 in FIGURE 13.

FIGURE 16 is a side view showing a succession of catch apron disks on one side of the machine.

FIGURE 17 is a perspective view of a fragmentary portion of the multiple pan conveyor mechanism taken at a location near the upper, forward sprocket on one side of the machine and illustrating the means by which pans are emptied of berries.

FIGURE 18 is a side view of a portion of the mechanism shown in FIGURE 17, with parts broken away.

FIGURE 19 is a sectional detail taken on line 19—19 in FIGURE 18.

Figure 1:
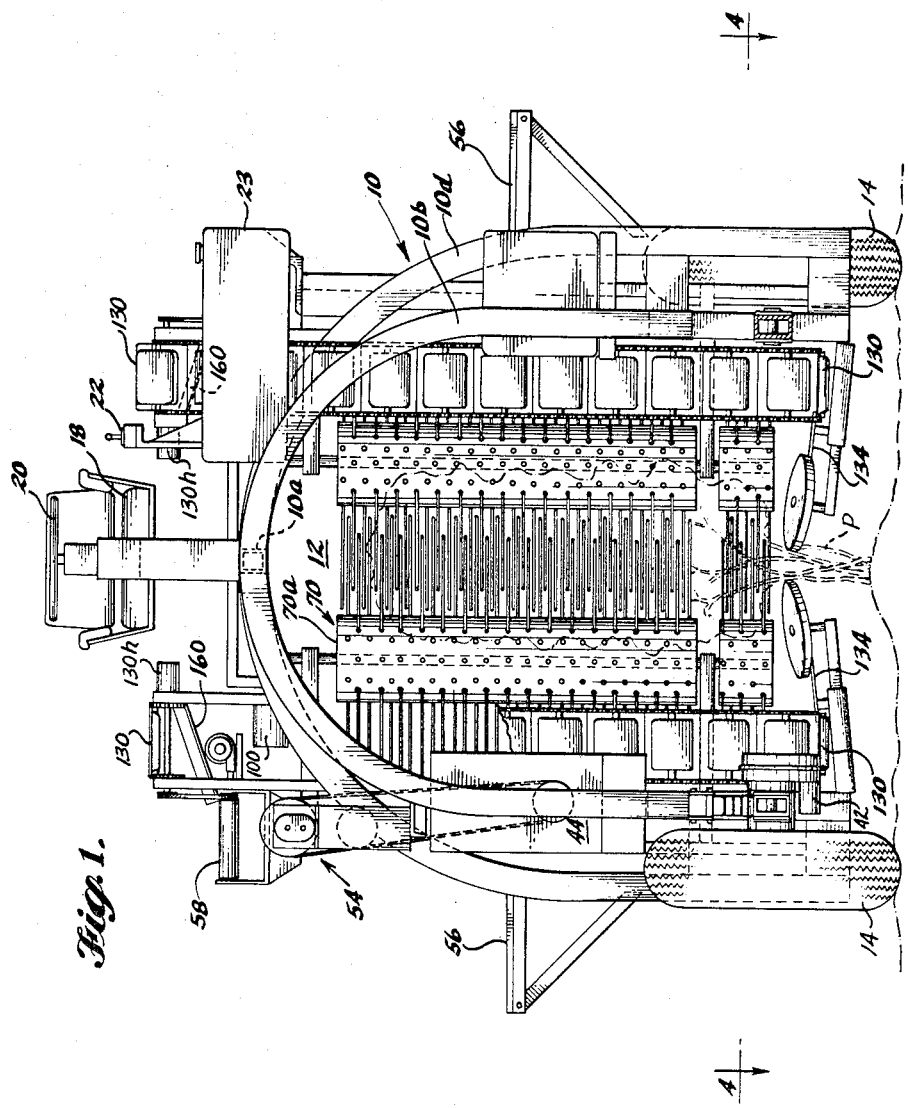
FIGURE 1 is a front end elevation view and FIGURE 2 is a side elevation view of the machine, with parts broken away for clarity of illustration.
Figure 2:
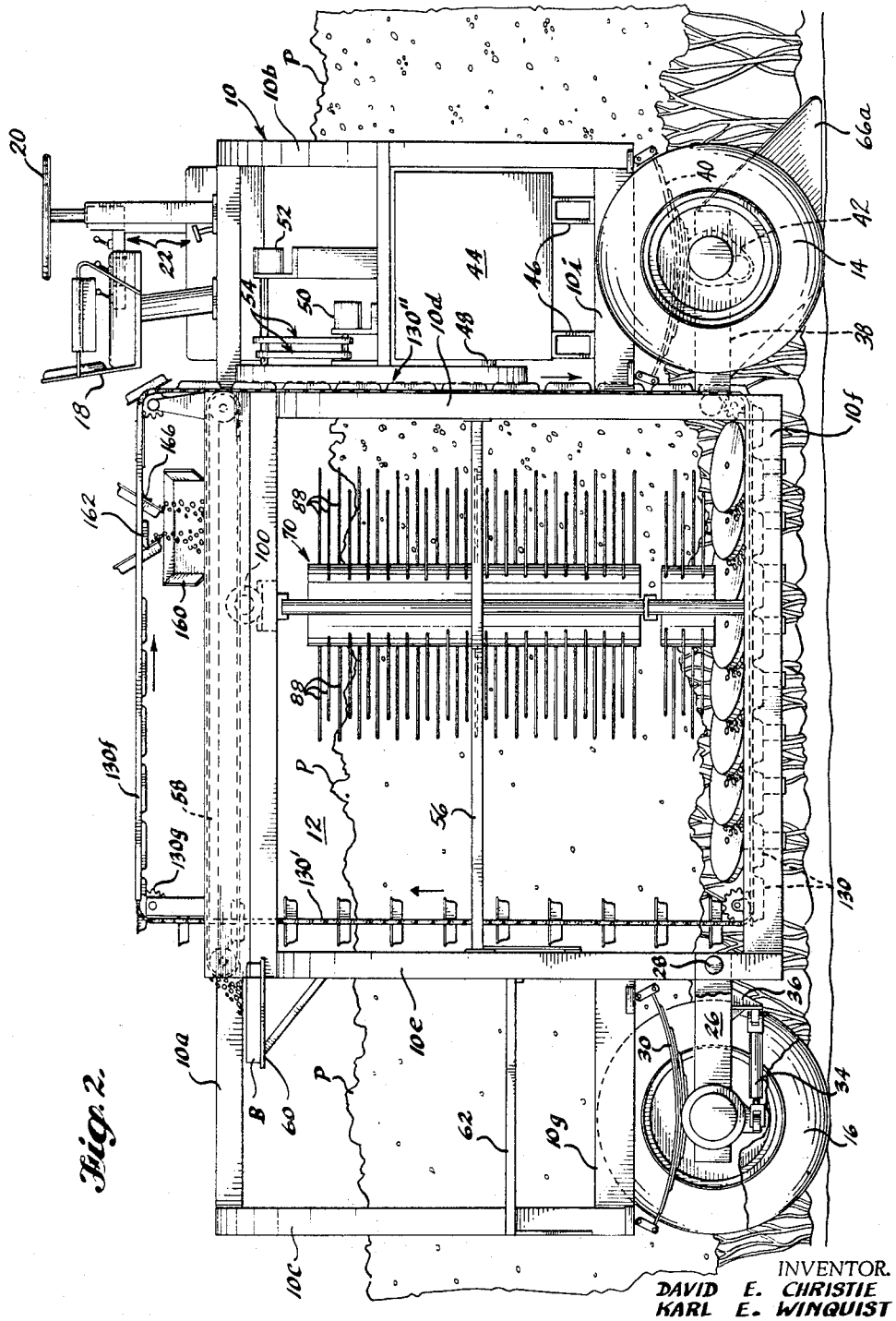

In its illustrated form the harvester machine comprises the overarching carriage frame 10 which defines a longitudinally extending space 12 through which the berry bushes pass during movement of the carriage in the harvesting operation. Power driven front wheels 14 and steerable rear wheels 16 are spaced apart, as are the frame sides to which they are mounted, by a suitable distance gauged to the intervals between rows of berry plants. An operator's seat 18, steering wheel 20 and auxiliary controls 22 are mounted atop frame 10 at the forward end for maximum visibility of the oncoming row of plants P ahead of the machine. In general the operating parts of the harvester, that is the parts which operate upon the plants to dislodge the berries and which then gather the dislodged berries for appropriate conveyance to packing stations on the harvester, are mounted within the tunnel 12 and will be described in detail hereinafter.

Although the details of the carriage structure may vary widely with design preference, a brief description of that illustrated may be in order. A longitudinal box beam 10a at the top of the frame structure interconnects the front and rear frame arches 10b and 10c and the somewhat wider intermediate frame arches 10d and 10e. In addition to various secondary structures interconnecting the main frame arches, the intermediate arches 10d and 10e are interconnected at their lower ends by the longitudinals 10f. Arch 10c is connected to arch 10e by longitudinals 10g and appropriate transverse beams 10h. Similarly front arch 10b is connected to the intermediate arch 10d by longitudinals 10i and transverse members 10j. Appropriate bracing members and other frame parts which support operating components and personnel will be referred to later herein or will appear from an examination of the drawings. Such details constitute no essential part of the invention as such and are therefore not illustrated or described in specific terms.

Springing of the rear wheels 16 is accomplished by mounting them on the aft ends of arms 26 pivoted at 28 on aligned horizontal pivots so as to permit the arms to bear upwardly against the leaf spring assembly 30 suitably shackled to the frame members 10g and to the arms. Such rear wheels are mounted to turn on the vertical shafts 32 under control of the hydraulic actuators 34 interconnecting wheel hub assembly lever arms 32a and supporting brackets 36 so as to permit turning these wheels without interference with or from their springing action. In like manner the front wheels 14 are mounted on pivoted arms 38 which react upwardly against the respective spring assemblies 40. The front wheels are independently driven by hydraulic motors 42 carried by the respective supporting arms 38 as shown.

Power to drive the carriage and associated systems is derived from the internal combustion engine 44 mounted on frame members 46 at one side of the carriage, such engine having an output shaft 48 which drives one or more hydraulic pumps, such as the pumps 50 and 52, through a system of belts and pulleys as shown at 54. The hydraulic medium is used for activating various units in the harvester because of its convenience for power transmission and for ease and reliability of control.

Suitable side platforms 56 at opposite sides of the intermediate section of the carriage are placed at an elevation which permits inspectors to stand there in order to cull and clean berries moving aft on the discharged conveyor runs 58 (to be described) to the packing stations 60 at which, on either side of the machine, receiving containers or boxes B are placed to catch the berries. Workers' platforms 62 are also provided adjacent the packing stations to handle the boxes as they are filled.

It will be recognized that a machine of the described type will be fairly high above ground at its highest point if designed to harvest berries of many common varieties, because some of these grow to heights of 6 or 8 feet. The tunnel space through the machine must accommodate these bushes without injury to the bushes and without interference with or from the bushes, posts or other physical objects in the operation of the machine.

At the forward end of the machine deflector guards 66 at each side of the carriage are designed with forward lower extremities 66a placed low to the ground, and slope upwardly and aft therefrom so as to pick up any straggling vines which lie close to the ground and direct them upwardly and inwardly into general proximity to the central grouping of plants P in the row where they will pass between the shaker units. As the machine advances along the row of plants the plants passing these deflectors first encounter the forwardmost disks 68 of a multi-disk catch apron device to be described. While thus engaged between these catch aprons the plants pass between the multi-fingered shaker devices 70 stationed on respectively opposite sides of the machine. Berries dropping from the plants fall into the catch apron assembly and are directed thereby onto conveyor mechanism for subsequent disposal in the machine. In a general way, these multi-disk aprons may be regarded as a moving closure which shapes itself to the composite contour presented by the successive clumps of plants, posts and other obstacles at a level near the ground or at least below the level at which berries will grow, to the end that no sizable open spaces will remain through which berries could drop and be lost. At the same time these spring-urged disks rolling against the plants at opposite sides tend to compact them to a degree for passage into the space between the shakers 70.

The two shakers 70 are of similar construction, each comprising an elongated upright tubular member which in the example is formed in two parts, 70a and 70b, separated slightly to accommodate between them the end of supporting arm 72 (FIGURE 6). This arm cooperates with the upper arm 74 to support the shaker guide shaft 76. Both arms are mounted on a sleeve 78 which is free to revolve on pivots 80 defining a vertical axis about which the shaker swings. Arms 72 and 74 are urged toward a normal limiting position directed transversely to the direction of carriage travel (FIGURE 4) by springs 81, but are permitted to swing outwardly in order to allow any separation of the shakers necessary to accommodate the plants, posts, etc.

Tubular member 70a has concave end plates 70c apertured to pass the supporting shaft 76 which extends through a fitting 72a in the end of arm 72 and passes through apertures in the end plates 70d of lower tubular member 70b. The shaft 76 extends upwardly through a suitable fitting in the end of arm 74 and is free to rotate on its longitudinal axis in the respective arms so as to permit the tubular members to rotate. A helical spring 82 encircling shaft 76 rests on arm 72 and reacts upwardly against a collar 84 pinned to the shaft at the lower side of the end plate 70c within tubular member 70a. The spring 82 supports the weight of the rotary assembly comprising the shaft, the tubular members and the elements carried thereby or associated therewith. This spring is designed to cooperate with the vibrational drive mechanism 86 in reciprocating the shaker assembly up and down along the axis of shaft 76.

Tubular members 70a and 70b carry a large number of radially projecting rod-like fingers 88 distributed along the length and about the periphery of the tubular members. These shaker fingers penetrate the foliage and branches of the berry plants in the manner depicted so as to become more or less interlocked with the vegetation during advance of the machine along the plant row P. During such advance the reaction of the plants on the shaker fingers 88 causes the freely pivoted shakers to rotate at an angular velocity related to the speed of the machine. Rapid vibration of the shakers vertically is transmitted to the plants by these fingers in order to dislodge the ripe berries.

In FIGURE 6 the shaker fingers 88 are shown all of the same projecting length, whereas in FIGURE 7 the fingers near the upper ends of the tubular members 70a project outwardly by a greater distance than fingers at lower levels on the tubular members. The shape and other characteristics of the plants being processed influence choice of contour of the shakers as defined by variations in tip locations of their fingers in order to achieve complete "picking" of the berries. For example, in order to vibrate the tops of bushes to the same extent the sides are vibrated the fingers may have to be longer near the top of the shakers than in the mid regions, as seen in FIGURE 7. The purpose in any case is to insure essentially uniform penetration and engagement of the shaker fingers with the plant vegetation to the extent necessary in order to vibrate all berry-bearing parts of the plants sufficiently to dislodge the ripe berries without in some regions damaging the plants or dislodging unripe berries due to overvibration.

As shown in FIGURES 8 and 9 the elongated shaker fingers 88 are of rod-like form and project through apertures in the wall of tubular member 70a or 70b. Within each wall aperture is mounted a clamp unit 90 to hold the finger releasably in a given radially projecting position. Such a clamp unit may comprise the tubular sleeve 92 threaded exteriorly to receive the retainer nuts 94 bearing against opposite sides of the tubular wall to hold the sleeve in position. A split (or malleable) ring 96 encircles the finger 88 and bears in a conical recess in the outer end of the threaded sleeve 92. A clamp nut 98 serving as a keeper for the ring 96 and when tightened on the end of the threaded sleeve compresses the split ring 96 and thereby clamps it firmly against finger 88 to hold the finger against sliding lengthwise. When the clamp nut 98 is loosened, the finger 88 may be slid lengthwise in order to vary its projecting length exteriorly of the tubular member 70a. Inasmuch as the tubular members are of relatively large diameter, they will accommodate the inner ends of the fingers 88 when it is desired to shorten their projecting length.

Referring to FIGURES 6, 10, 11 and 12, the vibration drive mechanism 86 for each shaker assembly is mounted on the upper supporting arm 74 and comprises a hydraulic motor 100 which is connected to turn a crank shaft 102 having a crank head 104 on the end thereof. This crank head has a T-shaped slot 106 extending transversely across the face thereof to accommodate a similarly shaped slider 108. A bolt 110 is threaded into the slider and extends outwardly therefrom to include a head 110 engageable by a wrench for turning the bolt, an enlarged shank portion 112 and an intermediate flange or stop 114. A groove 116 is milled in the base of the slot 106 along its entire length to receive and guide the post 118 projecting axially from the inner end of the bolt 110. A small tip 120 projects axially from the post 118 and serves as a locating element selectively engageable with any of different locating holes 122 in the base of the groove 116 at intervals along the length thereof. Depending upon the locating hole 122 thus selected, the length of crank arm on which the bolt 110 is bodily rotated about the axis of shaft 102 is established.

Coupling of the crank bolt 110 to the shaker shaft 76 is effected through a link 124. The upper end of this link is apertured to pass the bolt shank 112 and to accommodate an anti-friction bearing 126 surrounding the bolt shank. The lower end of the link 124 is pinned at 128 to an upward extension 76a of shaker shaft 76. As the crank shaft 102 is rotated by the hydraulic motor 100 connecting shaft 76a is reciprocated up and down. Mechanical load if supported by a spring under conditions of static equilibrium. As previously stated the vibration speed of the shaker assembly by the action of spring 82 which tends to support the weight of the shaker assembly approximately in a mid-position of the vibration stroke thereof, which is essentially the position the shaker would assume if supported by a spring under conditions of static equilibrium. As previously stated the vibration speed of the shakers may be varied, this being accomplished by varying the rate at which hydraulic fluid is pumped through the motor 100. The valving system by which this is controlled will be described later herein. The stroke of vibration is varied simply by unscrewing the bolt 110 sufficiently in the slider 108 to retract the bolt tip 120 from its locating hole 122, whereupon the slider is moved along the slot 106 into registry with a different hole 122 corresponding to the desired throw or radius arm of the crank, whereupon the bolt is threaded back into position advancing the tip 120 into the newly chosen hole and tightly locking the parts together.

For example, in harvesting Santiam blackberries it was found that drum vibration ranging from one-fourth inch to three eighths inch amplitude and from 850 cycles per minute to 1500 cycles per minute would be adequate to cover the range of harvesting conditions likely to be encountered. Under average harvesting conditions of weather, time of day and growth characteristics of these plants a vibration amplitude of approximately three-eighths inch or less is optimum at a frequency of 1000 cycles per minute. In the case of Marion blackberries the vibration amplitude range should be about the same as with the Santiams, but the frequency range should be somewhat lower, i.e. between 800 and 1200 cycles per minute, with 900 cycles per minute being about optimum under average harvesting conditions at a vibration amplitude of one fourth inch or slightly higher. Red raspberries (Willamette) require slightly higher vibration amplitude (three-eighths inch to one-half inch) at a frequency ranging between 900 and 1200 cycles per minute. Again, under average harvesting conditions an amplitude of three-eighths inch or slightly higher at a frequency of about 1000 cycles per minute is about optimum. It will be recognized, however, that there are certain definite harvesting conditions which affect the determination of optimum amplitude and frequency in particular cases, that the relationships are too complex to be readily defined, and that experience of the operator is presently the best guide for proper setting of the amplitude and frequency controls.

In order to catch all of the berries dislodged from the plant by the shakers and direct them onto suitable conveyors such as conveyors 130 having runs or stretches extending along opposite sides of the carriage near the bottom thereof, catch aprons are provided, including the two series of successively overlapping disks 132 bearing in rolling contact inwardly against opposite sides of the plants. These two rows of free-turning disks 132 provide an outwardly and downwardly sloping receiving surface upon which the berries drop. Berries rolling off these disks due to their slope fall upon the sloping plates 134 underlying and extending outwardly from the respective rows of disks to the conveyors. As illustrated in FIGURES 13, 14, 15 and 16 each disk 132 is rotatively mounted by a journal pin 142 on a post 140 standing up from the outer end of a cantilever support arm 136. Support arms 136 are telescopingly received in respective cantilevered guide tubes 138. Posts 140 elevate the disks sufficiently above the level of the lower (receiving) runs of conveyors 130 to permit the receiving plates 134 underlying the disks to have sufficient slope for the berries to roll outwardly to the conveyors. Guide tubes 138 are mounted by plates 144 bolted to the frame members 10f. Helical springs 146 received within the guide tubes 138 are socketed in an enlargement bore 136a within the arms 136. These springs encircle guide shafts 148 slidably engaged in counterbores 136b found axially within the arms 136.

Arms 136 and the associated interiors of guide tube 138 are of square or rectangular cross-section (FIGURE 14) so that there is no tendency for relative rotation between the arm 136 and the rigidly mounted guide tube. However, the guide tube 136 is sloped inwardly and upwardly across the width of the machine and is also turned on its axis so that its upper face is sloped downwardly and forwardly in the direction of carriage travel. Thus, the post 140 is inclined laterally outwardly and forwardly, and with it the disk 132 which it supports. Thus, berries B dropping from the vines under action of the shakers are intercepted by the series of disks and tend to migrate to the pockets 132a (FIGURE 16) defined by the top face of one disk and the adjacent peripheral edge of the overlapping disk. Being in contact with the peripheral edge the berries are progressively urged outwardly toward the catch plates 134 due to the rotation of the disks. This action aids the inherent tendency for the berries to roll by gravity outwardly to the catch plates due to the slope of the disks. It will also be evident that the slope of the disks in the direction fore and aft is desirable in order to permit the row of disks to extend substantially in a horizontal plane, rather than to stair-step upwardly along the length of the machine, notwithstanding the finite thickness of individual disks.

Springs 146 and the slidable engaged arms, tubes and guide shafts associated with the individual disks permit each disk to be spring-pressed into rolling contact with the plants and to yield outwardly, independently of the other disks, as necessary in order to accommodate clumps of plants, posts or other obstacles in the row. By independently mounting the disks in this manner the row of disks on each side of the harvester will shape itself to the contour of the plants and other physical elements intervening between the rows of disks so as to provide a maximum degree of closure around the base of the plants as the harvester advances. In this manner the amount of open space which remains and through which berries could be lost is minimized. Preferably the individual disks have foam rubber or similar soft and elastic material 132b around their peripheries. These tires or rims of soft material further help in closing the spaces around the base of the plants in order to avoid loss of berries and they also insure good rolling contact of the disks with the plants without abrading or otherwise damaging the plants.

Conveyors 130 comprise an endless series of chain-connected shallow trays or pans 130a the upper edges of which substantially abut each other in extending along the horizontal stretch or run adjacent the multi-disk apron assemblies so that berries rolling over the catch plates 134 will fall into one or another of the pans. Each individual pan is pivotally supported pendulously on aligned pivot pins 130c projecting into bosses 130b on opposite sides of the pan. These pivot pins project transversely from the inner sides of the parallel conveyor chains 130d. Along the lower or horizontal stretches adjacent the catch aprons, the conveyor chains are supported in guide channels 130e and the pans slide on the stabilizer surface 130h to avoid their being tipped accidentally out of level position. Similar guide channels 130f extend along the top of the machine to guide the chains at that location also. Preferably the conveyor pans move rearwardly along the lower sides and are then elevated on the vertical run 130', with the individual pans remaining horizontal to hold their loads during this elevation phase. When they reach the top the pans are guided around the corner defined by the chain sprockets 130g into a horizontal run now moving forwardly of the machine. As the pans approach the transverse gravity chutes 160 they are inverted to discharge their contents upon these chutes. These gravity chutes are arranged to discharge upon the belt conveyors 58 disposed along each side of the machine and leading rearwardly to the packing stations 60 at which the receiving containers C are positioned to receive berries.

In order to invert and dump the pans automatically as each reaches the discharge point overlying one of the chutes 160, a camming deflector 162 is mounted in the path of the boss 130b and is so shaped as to tilt the pan and thereby the pan progressively through 90 degrees, i.e. from the position shown at the left in FIGURE 18 to that shown in the middle of FIGURE 18. In the latter position the side of the boss now slides in contact with the top face of the camming element 162 for maintaining the pan in a vertically oriented position. Secondary camming deflectors 166 in the path of the pans completely invert the pans shortly after they have been tilted upright (right-hand portion of FIGURE 18). The inverted pans are now in the position desired for movement around the corner sprockets 168 and downwardly on the return run 130" for reloading.

Figure 20:
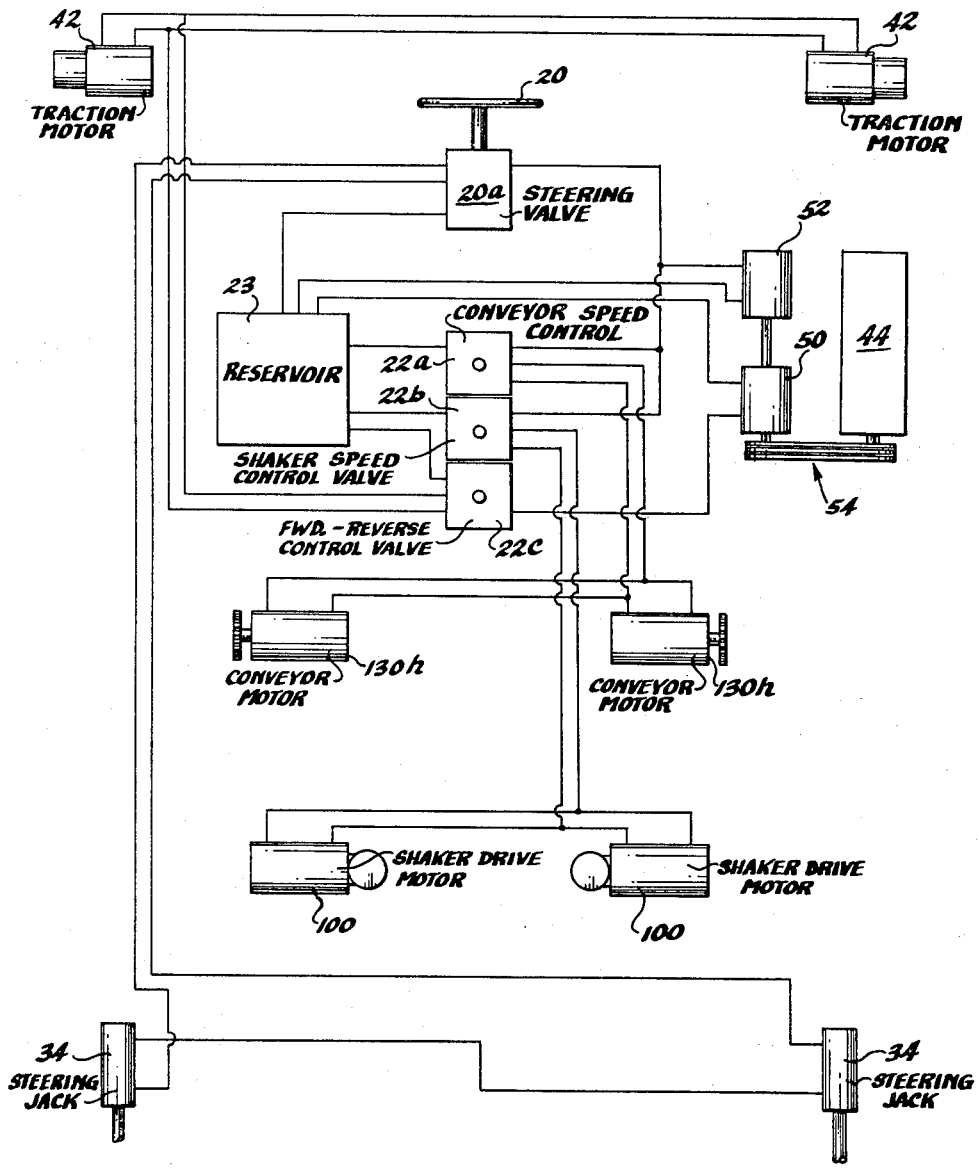
FIGURE 20 is a diagram of the hydraulic system and controls for the machine.

In FIGURE 20 the hydraulic system is diagrammed schematically. Pump 52 supplies pressurized hydraulic fluid for operating the steering jacks 34 through manually operable steering control valve 20a. It also supplies the conveyor drive motors through manually operable conveyor speed control valve 22a, and the shaker drive motors 100 through manually operable speed control valve 22b. Pump 50 supplies the carriage traction motors 42 through manually operable control valve 22c. The pumps 50 and 52 are sized in accordance with their respective loads and pressure requirements. Control valves 22a, 22b and 22c are of any suitable type by which the proportions of fluid by-passed to the reservoir 23 in relation to that directed to and through the respective motors may be varied as a means to vary motor speed. In this manner vibration frequency of the shakers may be varied to any desired value, as may vehicle speed and conveyor speed, each independently, in order to achieve optimum operation of the machine suiting the dual requirements of maximum production rate and thorough removal of ripe berries, without adverse effect on the plants.

We claim as our invention:

1. A berry harvester comprising a ground traversing carriage with a frame top and frame sides interconnected by said top in transversely spaced relationship forming a space therein through which berry plants pass during advance of the harvester, means mounted upon the carriage within said space and operative upon the plants to dislodge berries therefrom, and means mounted upon the carriage and within said space to catch and collect such berries, comprising a plurality of generally flat rotary disks extending generally horizontally in successive overlapping serial relationship along each of opposite sides of said space to form catch aprons, means rotationally supporting and reciprocatively guiding said disks to permit independent rotation and bodily reciprocative movement of the disks generally transversely to the direction of carriage movement, and force-applying means urging the individual disks of each series toward those of the other series to close in rolling contact with the plants from opposite sides thereof, while permitting outward yielding of such disks to accommodate variations in plant growth.

2. The harvester defined in claim 1, wherein the means supporting the disks comprise a plurality of arms underlying the respective disks and extending outwardly therefrom transversely to the direction of travel of the carriage.

3. The harvester defined in claim 2, wherein the means supporting the disks further comprise enlongated guide members slidably engaged by the respective arms, and spring means operatively associated with said guide members and reacting on the individual arms to urge the disks against the plants.

4. The harvester defined in claim 3, wherein each disk comprises a rigid body portion and an elastically yieldable rim portion of such softness as to mold itself conformably to the plants to a degree enhancing the closure of the series of disks against the plants.

5. The harvester defined in claim 1, wherein each disk comprises a rigid body portion and an elastically yieldable rim portion of such softness as to mold itself conformably to the plants to a degree enhancing the closure of a series of disks against the plants.

6. The harvester defined in claim 5, wherein the disks of each series slope downwardly in the direction away from the opposite series, and receiving means positioned beneath and along the lower portions of the disks of each series to catch berries rolling off the disks.

7. The harvester defined in claim 6, wherein the individual disks are also sloped upwardly in the direction of travel to form pockets into which the berries settle for channeling to the receiving means.

8. The harvester defined in claim 1, wherein the disks of each series slope downwardly in the direction away from the opposite series, and receiving means postiioned beneath and along the lower portions of the disks of each series to catch berries rolling off the disks.

9. The harvester defined in claim 8, wherein the individual disks are also sloped upwardly in the direction of travel to form pockets into which the berries settle for channeling to the receiving means.

10. A berry harvester comprising a ground traversing carriage formed with a frame top and frame sides interconnected by said top in transversely spaced relationship forming a space therein through which berry plants pass during advance of the harvester, means mounted upon the carriage within said space and operative upon the plants to dislodge berries therefrom, and means mounted upon the carriage and within said space to catch and collect such berries, comprising a plurality of generally flat elements extending generally horizontally in successive overlapping serial relationship along each of opposite sides of said space to form catch aprons, said elements including rotational means adapted for rolling contact wtih the plants, means supporting and reciprocatively guiding said elements to permit independent bodily reciprocative movement of the elements generally transversely to the direction of carriage movement, and force-applying means urging the individual elements of each series toward those of the other series to close in rolling contact with the plants from opposite sides thereof, while permitting outward yielding of such elements to accommodate variations in plant growth.

References Cited

UNITED STATES PATENTS

| | | | |
|---|---|---|---|
| 464,742 | 12/1891 | House | 56—29 |
| 515,031 | 2/1894 | Turner | 56—29 |
| 3,184,908 | 5/1965 | Rust | 56—330 |
| 3,225,894 | 12/1965 | Weygandt et al. | 56—330 X |

RUSSELL R. KINSEY, *Primary Examiner.*